(12) United States Patent
Hayashi

(10) Patent No.: US 6,684,044 B2
(45) Date of Patent: Jan. 27, 2004

(54) LIGHT SOURCE LAMP FOR IMAGE READER

(75) Inventor: Eiichi Hayashi, Saitama (JP)

(73) Assignee: Fuji Photo Optical Co., Ltd. (JP)

( * ) Notice: Subject to any disclaimer, the term of this patent is extended or adjusted under 35 U.S.C. 154(b) by 0 days.

(21) Appl. No.: 10/106,176

(22) Filed: Mar. 26, 2002

(65) Prior Publication Data

US 2002/0141178 A1 Oct. 3, 2002

(30) Foreign Application Priority Data

Mar. 30, 2001 (JP) ........................................ 2001-102636

(51) Int. Cl.$^7$ ............................................... G03G 15/04
(52) U.S. Cl. ........................................ 399/220; 399/221
(58) Field of Search .............................. 315/32, 49, 50, 315/56, 58, 71; 399/220, 221, 177

(56) References Cited

U.S. PATENT DOCUMENTS 5,616,989 A * 4/1997 Taillie et al. ................. 315/32

FOREIGN PATENT DOCUMENTS

JP 06255568 10/1994
JP 09072795 3/1997

* cited by examiner

Primary Examiner—Hoang Ngo
(74) Attorney, Agent, or Firm—Price, Heneveld, Cooper, DeWitt & Litton

(57) ABSTRACT

A light source lamp socket of an image reader is formed to be capable of being placed as close to a platen glass as possible to increase the intensity of light beams to be irradiated on a original. A part of each of lamp socket attached on the both ends of a lamp tube of a light source lamp, which faces a platen glass, is cut-away into the shape of one or more flat surfaces such that a part of the lamp tube is exposed from a part of such a flat portion. Therefore, the light source lamp can be move closer to the platen glass a distance corresponding to the depth of the cut-away section of the lamp socket.

11 Claims, 8 Drawing Sheets

LIGHT SOURCE LAMP FOR IMAGE READER

BACKGROUND OF THE INVENTION

1. Field of the Invention

This invention relates to an image reader for irradiating an original with light beams from a light source lamp and reading data about an image formed on the original based on a reflected light beams and particularly to the structure of a light source lamp for being placed as close to an original as possible.

2. Description of the Related Art

An image reader such as a copying machine or scanner is provided for reading out image data of an original on paper or the like to subject the image data to a various kinds of processing. Generally, the image reader is composed of a light source lamp such as a fluorescent lamp for irradiating an original with light beams and a light receiving station including a photoelectric converter device such as CCD (Charge-Coupled Device). The reflected light beams from the original is guided to enter a light receiving station. There are two types of image readers known in the art, a stationary original type and an moving original type.

The stationary original type image reader is disclosed, for example, in Japanese Patent Laid-Open Publication No. 10-257252. The image processor is designed to irradiate an original placed on a platen glass with light beams from a light source lamp being moved along the original. In addition, the optical path length from the original to a light receiving station should be kept at a constant even though the position for irradiating the original with light beams varies. A reflector or the like is also provided for introducing reflected light beams to the light receiving station. In this type, furthermore, the reflector or the like is designed to move along the original together with the light source lamp. In the case of the moving original type image reader is disclosed, for example, in Japanese Patent Laid-Open Publication No. 8-122938. A light source lamp is fixed on a predetermined position while an original can be moved sequentially to change its position for irradiating the original with light beams from the light source lamp to read image data from the original.

In recent years, it has been required that an image reader obtains image data more accurately because of the need for faithful reproduction of image data when it is reproduced on a display connected to a copying machine or a personal computer.

For attaining accuracy of obtained image data, a person skilled in the art generally increases the amount of light beams from the light source lamp to enhance the brightness of the original. However, the intensity of light from the light source lamp has its own limits. Therefore, it is difficult to obtain image data more accurate than the accurate image date presently obtainable in the art.

SUMMARY OF THE INVENTION

An object of the present invention is to provide a light source lamp structure for an image reader that allows the increase in brightness of the exposure to an original by placing the light source lamp as close to an original as possible.

As the technical means for attaining the above object, a first aspect of the present invention is to provide a light source lamp structure of an image reader to read an image formed on a original by irradiating the original placed on a platen glass with light beams from a light source lamp, capturing reflected light beams from the original, followed by introducing the reflected light beams to a light receiving station, and to read an image formed on the original, wherein a cut portion with a predetermined shape is formed on a part of a lamp socket of the light source lamp.

According to the present invention, the lamp socket may be arranged such that the cut portion is positioned in front of the platen glass. In contrast to the conventional lamp socket without such a cut portion, the lamp socket of the present invention can be placed closer to a top plate of a casing in which a platen glass is arranged in place, a distance equivalent only to the length of the cut portion. Such a configuration of the lamp socket permits positioning of the light source lamp closer to the original placed on the platen glass. Consequently, the original can be irradiated with more intense light beams compared with the conventional structure, thereby allowing an increase in brightness of the original.

Furthermore, a second aspect of the present invention is to provide a light source lamp structure of an image reader to read an image formed on a original by irradiating the original placed on a platen glass with light beams from a light source lamp, capturing reflected light beams from the original, followed by introducing the reflected light beams to a light receiving station, and to read an image formed on the original, wherein a cut portion with an appropriate shape is formed on a part of a lamp socket of the light source lamp and a part of a lamp tube of the light source lamp is exposed from the cut portion.

According to the present invention, the light beams to be incident onto the original can be also irradiated from the portion of the lamp tube exposed from the lamp socket. Thus, the irradiation of light beams from the whole area of the lamp tube can be attained, allowing the increase in an effective range of light beams irradiation on the original. Consequently, the original can be irradiated with the large amount of light beams compared with the conventional one, allowing the increase in brightness of the original.

In the light source lamp structure of the image reader according to the present invention, the shape of the cut portion of the lamp socket may be a plane perpendicular to the output optical axis of the light source lamp.

For effectively irradiating the original with light beams, the light source lamp has the directivity of light beams irradiation to prevent structural components such as a carriage on which the light source lamp is mounted from being heated. Such directivity is determined so as to make reflected light beams from the original surely be incident on a reflector and is appropriately inclined from the vertical direction. Furthermore, the positional relationship between the lamp tube and the lamp socket is defined such that the directivity of the light source lamp can be coincident with a predetermined direction by engaging the lamp socket holding the lamp tube with a predetermined bracket at the time of mounting the light source lamp. Therefore, the cut portion can be formed on the plane perpendicular to the output optical axis of the light source lamp by cutting a part of the lamp socket with reference to the portion to be engaged with the bracket of the lamp socket.

In the case of exposing a part of the lamp tube to the plane perpendicular to the output optical axis of the light source lamp, light beams from such an exposed portion is incident on the original to be reflected toward the reflector. Therefore, the brightness of the original can be further increased.

In the light source lamp structure of the image reader according to the present invention, furthermore, the shape of the cut portion may be a plane substantially parallel to a surface of the platen glass opposite to the original placing side thereof, while the light source lamp is arranged in place. Therefore, the plane on which the cut portion is formed is brought into parallel to and is placed closer to the top plate of the casing that includes the platen glass. The result is that the light source lamp can be placed closer to the original on the platen glass, providing an increase in brightness of the original.

In the light source lamp structure of the image reader according to the present invention, the shape of the cut portion may be composed of: a plane perpendicular to the output optical axis of the light source lamp; and a plane substantially parallel to a surface of the platen glass opposite to the original placing side thereof while the light source lamp is being arranged in place.

Therefore, the original can be effectively irradiated with light beams generated from the light source lamp. In addition, the light source lamp can be placed close to an original as much as possible. Therefore, the brightness of the original can be increased at a maximum with the largest amount of illuminating light beams.

These and other features, objects and advantages of the present invention will become apparent upon reading the following description thereof together with reference to the accompanying drawings.

DETAILED DESCRIPTION OF THE EMBODIMENTS

Figure 11:
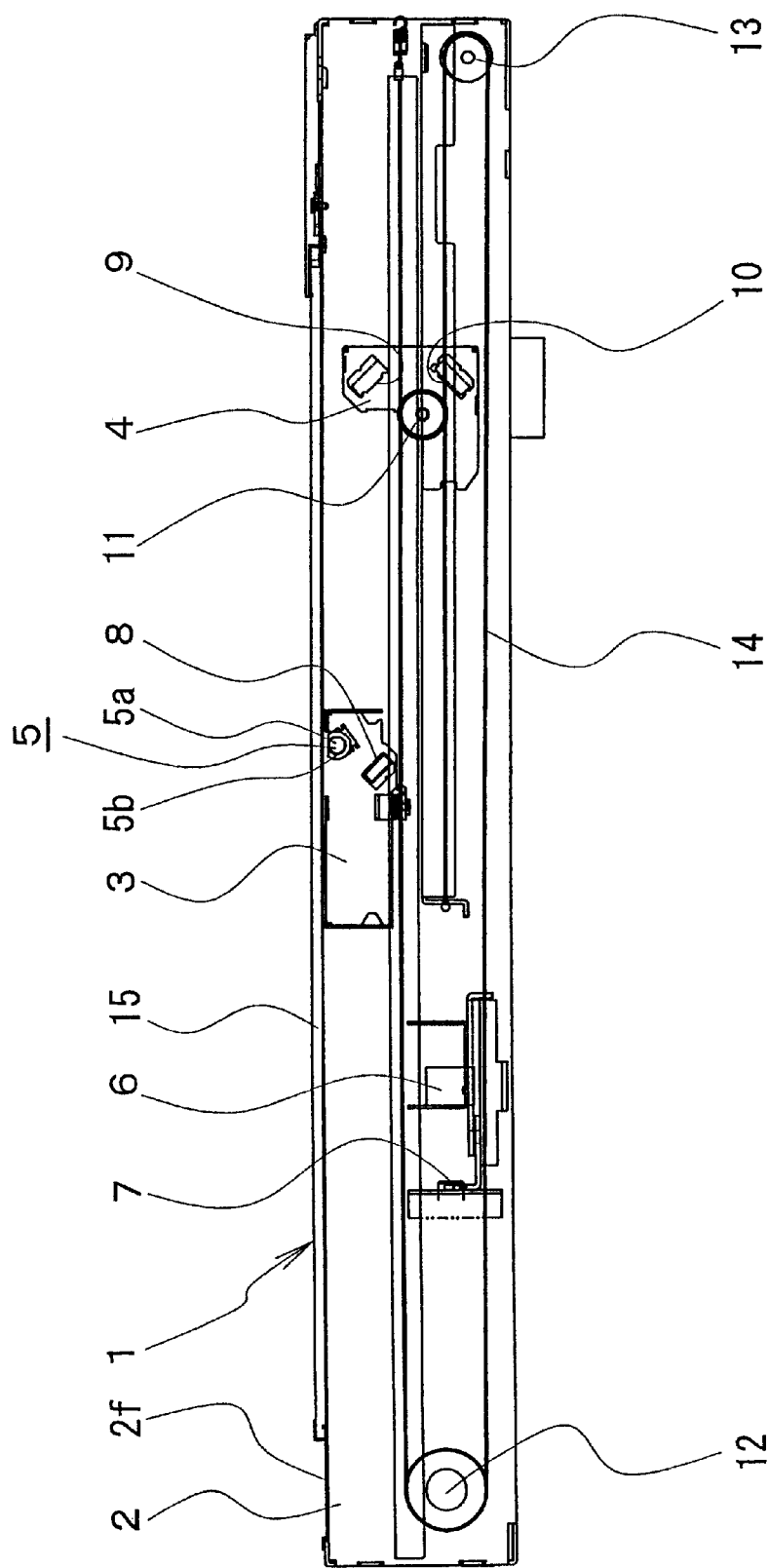
FIG. 11 is a schematic side view illustrating an image reader having the light source lamp structure of the present invention.
Figure 12:
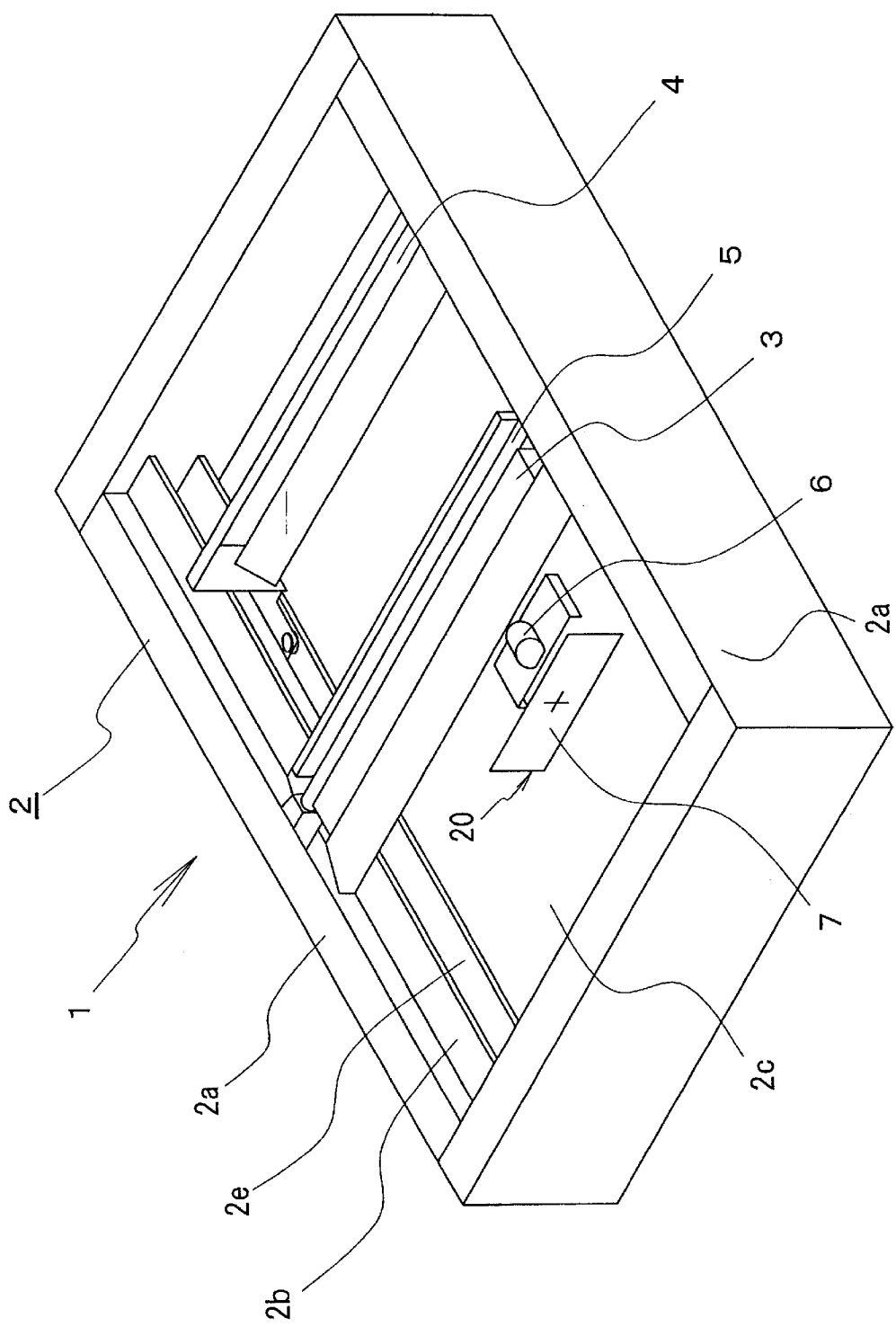
FIG. 12 is a perspective view schematically illustrating the configuration of an image reader.

Referring first to FIG. 12, there is shown a perspective view for schematically illustrating the configuration of an image reader 1 adapted to equip an image-data correcting device. The image reader 1 includes a casing 2 having two guide plates 2b, 2e arranged in parallel on the inner side of walls 2a longitudinally of the casing 2. As shown in the figure, a full rate carriage 3 is mounted on the guide plate 2b, while a half rate carriage 4 is mounted on the guide plate 2e. These carriages 3, 4 can be guided with their respective guide plates 2b, 2e to move longitudinally of the casing 2. In addition, there is a platen glass 15 (FIG. 11) attached on the upper surface of the casing 2. An original is placed on the platen glass 15. A light source lamp 5 such as a fluorescent lamp is mounted on the full rate carriage 3 and is used to irradiate the original with light beams. Also, an image focusing lens 6 and a photoelectric converter device 7 such as CCD are appropriately arranged on the bottom plate 2c of the casing 2.

Furthermore, as shown in FIG. 11, a first reflector 8 is arranged on the full rate carriage 3, while a second reflector 9 and a third reflector 10 are arranged on the half rate carriage 4. These reflectors 8, 9, 10 are arranged to form an optical path from the original to the photoelectric converter device 7 through the image focusing lens 6. The original reflects light beams from the light source lamp 5, and then the light beams reflected from the original is incident on the photoelectric converter device 7 after being reflected by each of the first, second, and third reflectors 8, 9, 10 in sequence. In the case of capturing image information on the original, the whole area of the original should be irradiated with light beams. Thus, the full rate carriage 3 is designed to be allowed to move over the whole area of the platen glass 15. In this case, the above optical path from the original to the photoelectric converter device 7 should be kept at a constant length even though the full rate carriage 3 moves. For this reason, the optical path can be kept at a constant length by synchronizing the movement of the half rate carriage 4 with that of the full rate carriage 3 under the conditions in which the movement of the half rate carriage 4 is set to almost half of the movement of the full rate carriage 3. The full rate and half rate carriages 3, 4 are driven by a driving mechanism known in the art including a wire 14 routed over pulleys 11, 12, 13 and so on.

Figure 9:
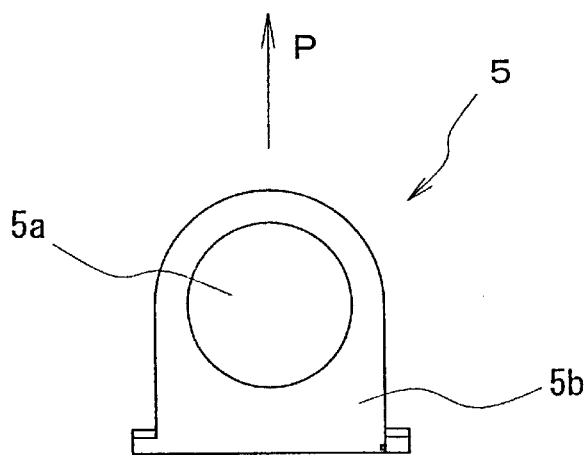
FIG. 9 is an end view of a conventional light source lamp structure of an image reader, prior to providing a lamp with the features of the present invention.
Figure 10:
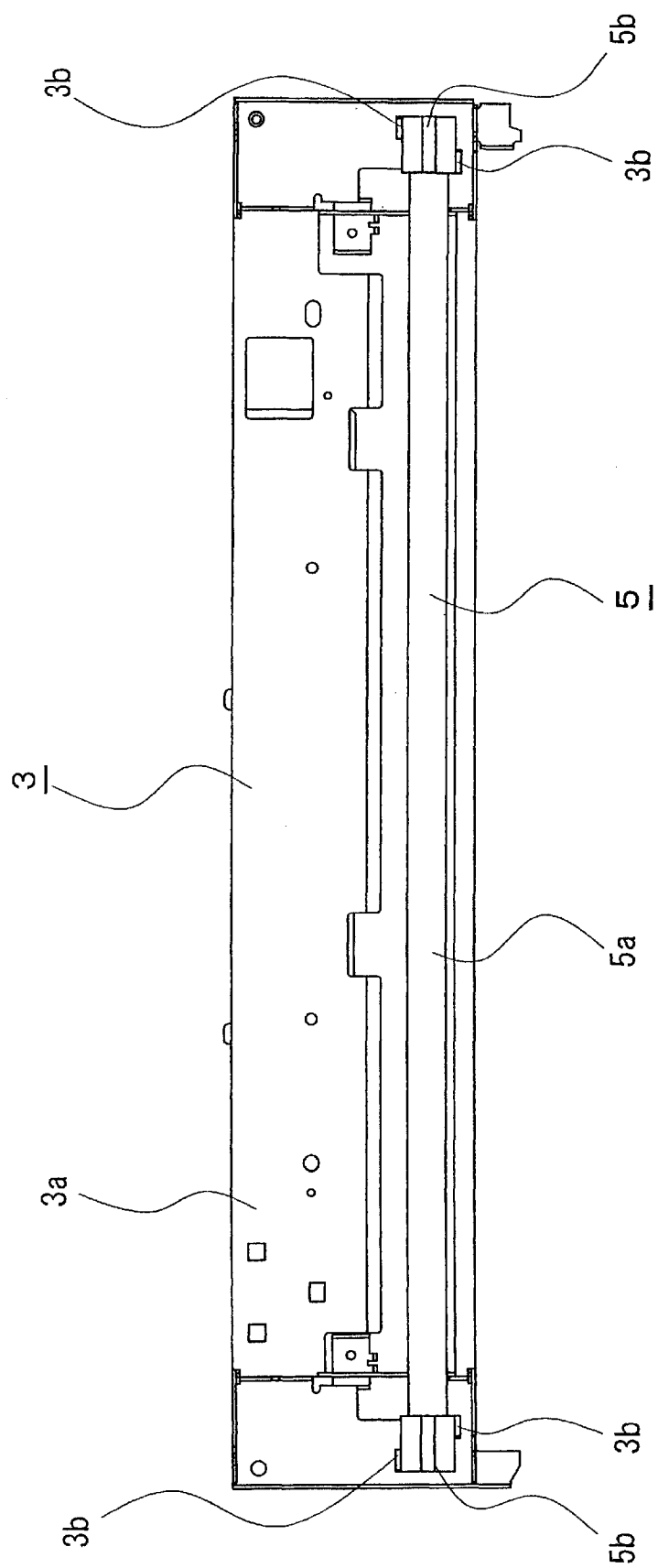
FIG. 10 is a top plan view of a fall rate carriage on which the light source lamp structure of the present invention is mounted.

FIG. 10 is a schematic plan view of the full rate carriage 3 that includes a box-shaped frame 3a prepared by bending a plate material into an appropriate shape and then appropriately clamping it to form a box-shape. The light source lamp 5 is built in the full rate carriage 3 such that the lamp 5 extends lateral direction of movement of the full rate carriage 3 and is placed on the end thereof on the half rate carriage-4's side. Lamp sockets 5b are attached on both ends of a lamp tube 5a of the light source lamp 5 such that the light source lamp 5 can be fixed on the lamp bracket 3b of the full rate carriage 3 through the lamp sockets 5b. Furthermore, the irradiation range of the light source lamp 5 is defined so as to surely obtain image data on the maximum-sized original by extending to the outside of the width of the maximum-sized original. For this reason, the lamp sockets 5b are located so as to face a top plate 2f that supports the platen glass 15. Next, the light source lamp 5 will be described in detail with reference to FIGS. 1 to 9, each of which is an end view of a light source lamp 5.

FIG. 9 shows a conventional light source lamp 5 prior to the present invention. The lamp socket 5b has a rounded end (i.e., an arc-shaped end in cross section) that faces the top plate 2f when it is mounted on the full rate carriage 3. In addition, the lamp tube 5a of the light source lamp 5 has the directivity of irradiation as indicated by the arrow P in FIG. 9 so as to output light beams from the center of the above arc-shape in the radial direction. As shown in FIG. 11, the lamp sockets 5b are inclined at a predetermined angle with respect to the platen glass 15. The light source lamp 5 is then attached on the lamp sockets 5b. Thus, the light source lamp 5 is located below the platen glass 15 such that the output optical axis P extends upward in a slanting direction with respect to the original on the platen glass 15. Therefore, the reflected light beams from the original can be allowed to be incident on the first reflector 8.

Figure 1:
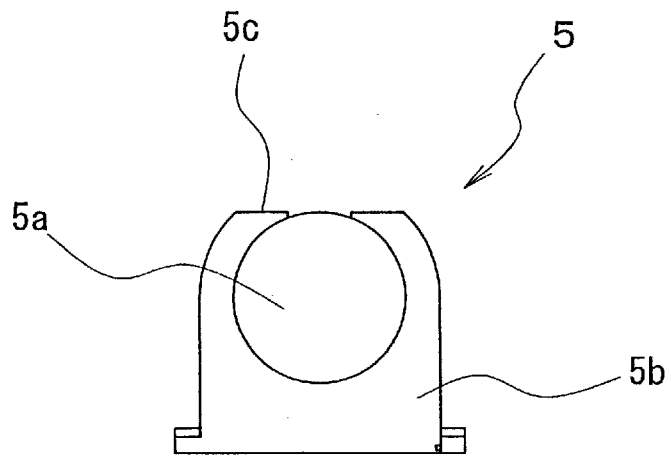
FIG. 1 is an end view of a light source lamp structure of an image reader in accordance with a first embodiment of the present invention.
Figure 2:
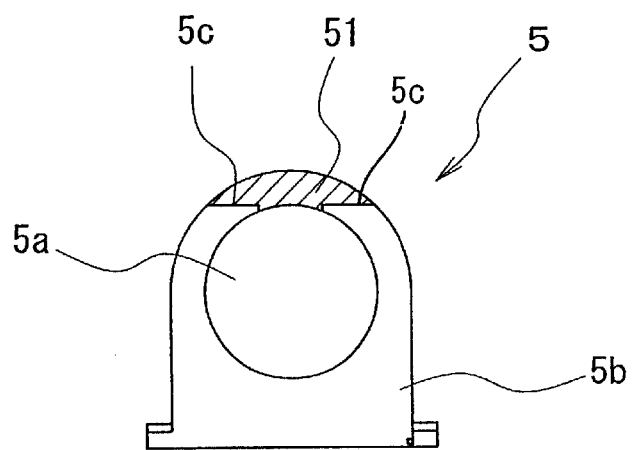
FIG. 2 is an end view of the light source lamp structure of the image reader in accordance with the first embodiment of the present invention, where a cut-away section is illustrated as the shaded area.

Referring now to FIG. 1 and FIG. 2, there is shown a light source lamp structure in accordance with a first embodiment of the present invention. The light source lamp 5 of the first embodiment has the same configuration as that of the conventional lamp shown in FIG. 9 except that a part of each lamp socket 5b is cut away as shown in FIG. 2. That is, an arc-shaped portion in cross section (i.e., the shaded portion 51 in FIG. 2) is cut away from the lamp socket 5b to form a flats 5c as the top end of the lamp socket 5b so as to expose a part of a lamp tube 5a from almost the center of the flats 5c. In addition, the flats 5c are formed so as to be perpendicular to the output optical axis P described above.

Figures 3A, 3B:
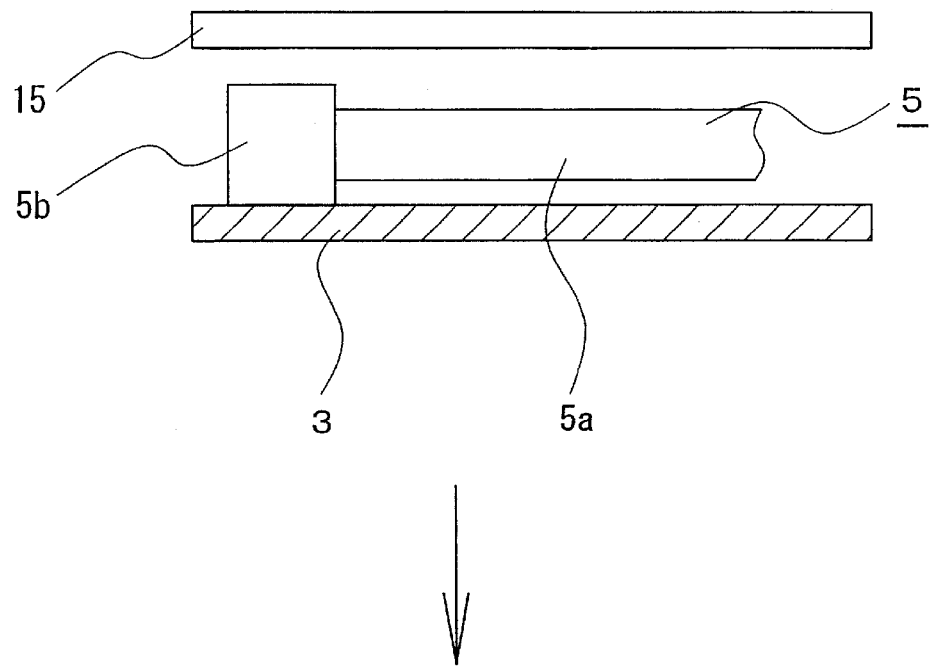
FIGS. 3a and 3b include explanatory views, including light intensity graphs, illustrating the difference between a conventional light source lamp structure (FIG. 3a) and the present light source lamp structure (FIG. 3b) with respect to their effective ranges of irradiation of light beams.

The light source lamp 5 of the present embodiment is configured as described above, so that it can be placed closer to the platen glass 15 than the conventional one in which no cut portion is formed on the lamp socket. In other words, the present embodiment places the light source lamp 5 closer to the original on the platen glass 15, so that the intensity of light beams to be irradiated on the original is increased. As a result, the brightness of the original can be also increased. As shown in FIG. 3, the light beams-emitting area can be extended in the direction longitudinally of the light source lamp 5. That is, if the lamp socket 5b does not have a cut portion as shown in FIG. 3 (a), the light beams-emitting area is within the length between the inner ends of the lamp sockets 5b. If the lamp socket 5b has the cut portion described above, as shown in FIG. 3(b), which places lamp 5 nearly twice as close to platen glass 15, the light beams-emitting area can be extended to near the outer ends of the lamp sockets 5b. In addition, the stable amount of light beams can be obtained at the center portion of the light source lamp 5, so that the effective area of light beams to be irradiated on the original can be extended. As a result, the original can be irradiated with the larger amount of light beams, than that of the conventional one.

Figure 4:
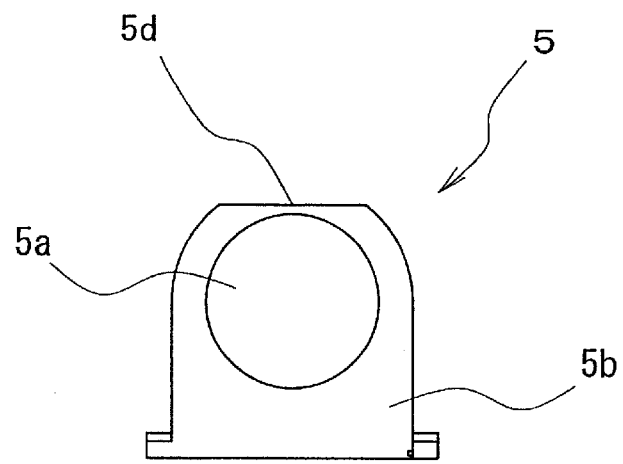
FIG. 4 is an end view of a light source lamp structure of an image reader in accordance with a second embodiment of the present invention.

Referring now to FIG. 4, there is shown a light source lamp structure in accordance with a second embodiment of the present invention. In the figure, the same structural components as those of the first embodiment are represented by the same reference numerals. In this embodiment, just as in the case with the first embodiment, an arc-shaped portion in cross section is cut into from the lamp socket 5b to form a flat 5d as the top end of the lamp socket 5b so as to be perpendicular to the output optical axis P described above.

In this embodiment, however, a part of a lamp tube 5a is not exposed from the flat 5d because a thin wall portion remains between the flat 5d and the lamp tube 5a.

The light source lamp structure of the second embodiment is also allowed to place the lamp 5 closer to the original on the platen glass 15. Thus, the amount of light beams to be irradiated on the original can be increased. As a result, the brightness of the original is also increased. According to the second embodiment, furthermore, the thin wall portion is formed as described above, so that the strength of the lamp socket 5b can be ensured.

Figure 5:
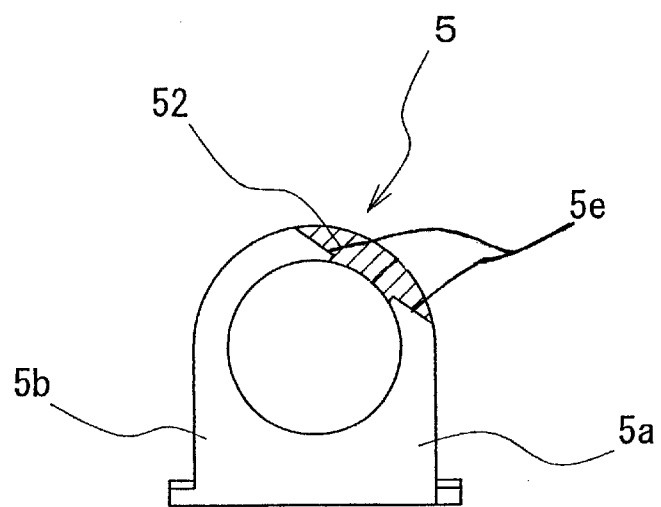
FIG. 5 is an end view of a light source lamp structure of an image reader in accordance with a third embodiment of the present invention, where a cut portion is illustrated as a shaded portion.
Figure 6:
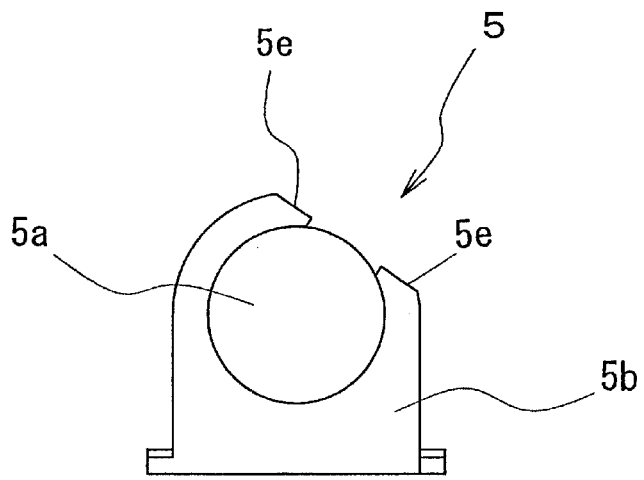
FIG. 6 is an end view of the light source lamp structure of the image reader in accordance with the third embodiment of the present invention.

Referring now to FIGS. 5 and 6, there is shown a light source lamp structure in accordance with a third embodiment of the present invention. In the figures, the same structural components as those of the first or second embodiment are represented by the same reference numerals. In this embodiment, an arc-shaped portion in cross section (i.e., the shaded portion 52 in FIG. 5) is cut away from the lamp socket 5b to form a flats 5e parallel to a surface (i.e., the back side) of the platen glass 15 which is opposite to the original placing side. In addition, a part of the lamp tube 5a is exposed from the center portion of the flats 5e.

Figure 8:
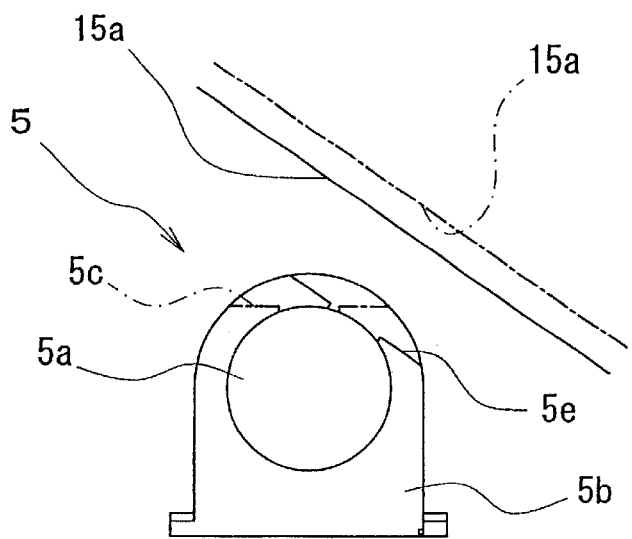
FIG. 8 is an end view illustrating the positional relationship between the light source lamp structure of the present invention and the platen glass equipped in the image reader on which such a light source lamp structure is mounted, where the structure that corresponds to the first embodiment is expressed by a short-dashed line and the structure that corresponds to the third embodiment is expressed by a solid line.

The light source lamp structure of the third embodiment is allowed to move closer to the original than the light source lamp structures of the first and second embodiment. FIG. 8 illustrates the positional relationship between the light source lamp 5 and the back side of the platen glass 15. In this figure, the positional relationship for the light source lamp structure of the first embodiment is indicated by a single-dotted line, and the positional relationship for the light source lamp structure of the third embodiment is indicated by a solid line. As is evident from the figure, the light source lamp structure of the third embodiment is able to move closer to the original than the second embodiment. In the third embodiment, furthermore, a part of the lamp socket 5b is located over the output optical axis P of the light source lamp 5, so that the effective range of irradiating the original with light beams as illustrated in FIG. 3 cannot be expected. As in the case with the second embodiment, the cut portion of the lamp socket 5b in accordance with the present embodiment may be provided with a thin wall portion between the flat portion 5e and the lamp tube 5a.

Figure 7:
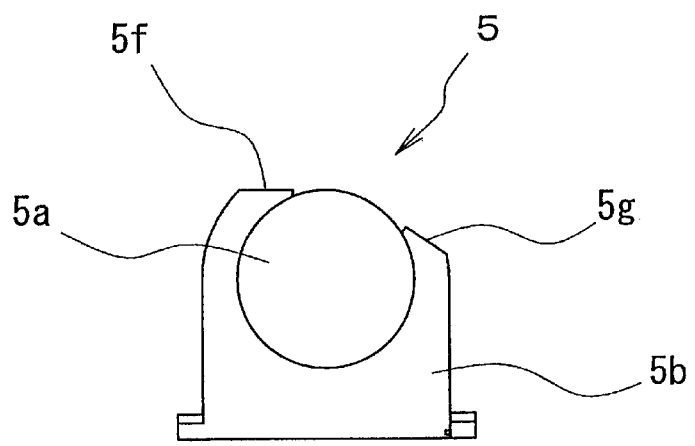
FIG. 7 is an end view of a light source lamp structure of an image reader in accordance with a fourth embodiment of the present invention.

Referring now to FIG. 7, there is shown a light source lamp structure in accordance with a fourth embodiment of the present invention. In this embodiment, a part of the lamp socket 5b is cut into such that two angularly offset flat portions 5f, 5g are formed thereon. In other words, the flat portion 5f is formed so as to be almost perpendicular to the output optical axis P, while the flat portion 5g is formed so as to be almost parallel to the back side 15a of the platen glass 15.

The light source lamp structure of the fourth embodiment is a combination of structural characteristics of the first and third embodiments. According to the fourth embodiment, the light source lamp 5 can be placed closer to the original at a maximum and the effective range of irradiating the original with light beams from the light source lamp 5 can be extended. Therefore, the original can be irradiated with the larger amount of light beams and the brightness of the original can be increased more. Alternatively, just as in the case with the second embodiment, the lamp socket 5b may be shaped so as to have a thin wall portion between the flat portions 5f, 5g and the lamp tube 5a.

The light source lamp 5 of each of the embodiments described above may be applied on any type of the image readers, such as stationary original type and moving original type. In the latter type, a light source lamp is fixed on a predetermined position while an original can be moved sequentially to vary its position for irradiating the original with light beams from the light source lamp to read image data from the original.

As described above, the optical lamp structure of the image reader in accordance with each of the above preferred embodiments is able to move the light source lamp close to the original as much as possible, so that the intensity of light beams to be irradiated on the original can be increased to allow the increase in brightness of the original. Therefore, the image data of the original can be obtained with high accuracy, allowing the reproduction of a copy using a copying machine or the like with high fidelity.

In addition, the light source lamp structure of the image reader in which a part of the lamp socket is cut into a predetermined shape so as to expose a part of the lamp tube is exposed from the cut portion has an advantage that the light source lamp can be placed closer to the original and the original can be also irradiated with light beams from the lamp tube exposed from the lamp socket. Therefore, the intensity of light beams to be irradiated on the original can be increased.

The lamp structure of the image reader in which the shape of the cut portion is a flat surface perpendicular to the output optical axis of the light source lamp has an advantage that the lamp socket is attached with respect to the output optical axis to allow an easy cutting process to cut a part of the lamp socket so as to become perpendicular to the output optical axis. Furthermore, the part of the lamp socket through which the output optical axis of the lamp tube can be extended is opened. Thus, the original can be irradiated with light beams passing through such an opening.

Furthermore, the lamp structure of the image reader in which the shape of the cut portion is a flat portion substantially parallel to a surface of the platen glass opposite to the original placing side thereof while the light source lamp is being arranged in place has an advantage that the light source lamp can be further moved closer to the original to allow the further increase in brightness of the original.

Moreover, the lamp structure of the image reader in which the shape of the cutting portion has a flat surface perpendicular to the output optical axis of the light source lamp and a flat portion substantially parallel to a surface of the platen glass opposite to the original placing side thereof while the light source lamp is being arranged in place has an advantage that the light source lamp can be moved closer to the original at maximum and the effective range of irradiating the original with light beams can be extended. Therefore, the brightness of the original can be increased and the image data can be obtained with high accuracy.

It will become apparent to those skilled in the art that various modifications to the preferred embodiment of the invention as described herein can be made without departing from the spirit or scope of the invention as defined by the appended claims.

What is claimed is:

1. A light source lamp structure of an image reader to read an image formed on an original by irradiating the original placed on a platen glass with light beams from a light source lamp, to pick up reflected light beams from the original, followed by introducing the reflected light beams to a light receiving station, and to read an image formed on the original, wherein the improvement comprises a lamp socket with a cut-away section with a predetermined shape to allow said light source lamp held in said lamp socket to be moved closer to the platen glass.

2. The light source lamp structure of an image reader as defined in claim 1, wherein the shape of the cut-away section is a plane perpendicular to an output optical axis of the light source lamp.

3. A light source lamp structure of an image reader to read an image formed on an original by irradiating the original placed on a platen glass with light beams from a light source lamp, to pick up reflected light beams from the original, followed by introducing the reflected light beams to a light receiving station, and to read an image formed on the original, wherein a lamp socket has a cut-away section with a predetermined shape exposing said light source lamp mounted in said socket, wherein the shape of the cut-away section is a plane perpendicular to an output optical axis of said light source lamp.

4. The light source lamp structure of an image reader as defined in claim 1, wherein the shape of the cut-away section is a plane substantially parallel to a surface of the platen glass opposite to an original placing side thereof when the light source lamp is mounted in the image reader.

5. A light source lamp structure of an image reader to read an image formed on an original by irradiating the original placed on a platen glass with light beams from a light source lamp, to pick up reflected light beams form the original, followed by introducing the reflected light beams to a light receiving station, and to read an image formed on the original, wherein a lamp socket has a cut-away section with a predetermined shape exposing said light source lamp mounted in said socket, wherein the shape of the cut-away section is a plane substantially parallel to a surface of the platen glass opposite to an original placing side thereof when said light source lamp is mounted in the image reader.

6. The light source lamp structure of an image reader as defined in claim 1, wherein the shape of the cut-away section defines a first flat having a plane perpendicular to an output optical axis of the light source lamp and a second flat having a plane substantially parallel to a surface of the platen glass opposite to the original placing side thereof when the light source lamp is mounted in the image reader.

7. A light source lamp structure of an image reader to read an image formed on an original by irradiating the original placed on a platen glass with light beams from a light source lamp, to pick up reflected light beams from the original, followed by introducing the reflected light beams to a light receiving station, and to read an image formed on the original, wherein a lamp socket has a cut-away section with a predetermined shape exposing said light source lamp mounted in said socket, wherein the shape of the cut-away section defines a first flat having a plane perpendicular to an output optical axis of said light source lamp and a second flat having a plane substantially parallel to a surface of the platen glass opposite to the original placing side thereof when said light source lamp is mounted in the image reader.

8. A pair of sockets for a light source lamp of an image reader, each socket having a pair of upwardly extending arms terminating in spaced-apart flats, said arms having a length such that said light source lamp mounted in said sockets extends beyond said flats.

9. The sockets as defined in claim 8 wherein said flats lie in a plane perpendicular to the optical axis of the lamp.

10. The sockets as defined in claim 8 wherein said flats lie in a plane parallel to a platen glass of the image reader.

11. The sockets as defined in claim 8 wherein one of said flats lies in a plane parallel to a platen glass and the other of said flats lies in a plane perpendicular to the optical axis of a lamp mounted in the sockets.

* * * * *